United States Patent Office 3,476,780
Patented Nov. 4, 1969

3,476,780
PRODUCTION OF EQUILENIN AND RELATED COMPOUNDS AND INTERMEDIATES THEREFOR
Gerald Arthur Smith and Gordon Hanley Phillipps, Greenford, England, assignors to Glaxo Laboratories Limited, Greenford, Middlesex, England, a British company
No Drawing. Filed June 21, 1966, Ser. No. 559,091
Claims priority, application Great Britain, June 22, 1965, 26,387/65
Int. Cl. C07c 167/14, 169/18, 169/08
U.S. Cl. 260—397.3    18 Claims

ABSTRACT OF THE DISCLOSURE

Equilenin and related steroid compounds aromatic in rings A and B are prepared from 3-keto-$\Delta^{1,4}$-9$\alpha$-halo-10-methyl-11$\beta$-hydroxy-, 3-keto-$\Delta^{1,4,8(9)}$-10-methyl-11$\beta$-hydroxy- or 3-keto-$\Delta^{1,4,7(8),9(11)}$-10-methyl-steroids by reaction with a Lewis base having a tertiary nitrogen atom and a dielectric constant above 15 together with a substance yielding chloride or bromide ions. Such aromatic steroids can be formed from the 3-keto-$\Delta^{1,4,8(9)}$-10-methyl-11$\beta$-hydroxy- or 3-keto-$\Delta^{1,4,7(8),9(11)}$-10-methyl-steroids by reaction with a strong acid and if the reaction is carried out in the presence of an alkanol 3-ether is produced.

This invention is concerned with a process for the production of equilenin and related compounds.

The aromatic steroid equilenin has been shown to posses oestrogenic activity and is, in addition, a useful intermediate in the preparation of other oestrogenic steroids. Thus, for example, equilenin and related compounds can be converted into the tetraene equilin and related compounds as is described in copending United States applications Nos. 559,074, filed June 21, 1966, and 559,066 filed June 21, 1966.

We have found that equilenin and related steroid compounds can be prepared from 3-oxo-1,4-dehydrosteroids having a 9$\alpha$-halogen substituent and a hydroxy group in the 11$\beta$-position by reaction with certain Lewis bases as defined below in the presence of a substance furnishing chloride or bromide ions. This process is illustrated in the following reaction scheme which also gives details of the preparation of the starting 9$\alpha$-halo-compound from 9,11-dehydro steroids already available as intermediates in the synthesis of corticoid steroids.

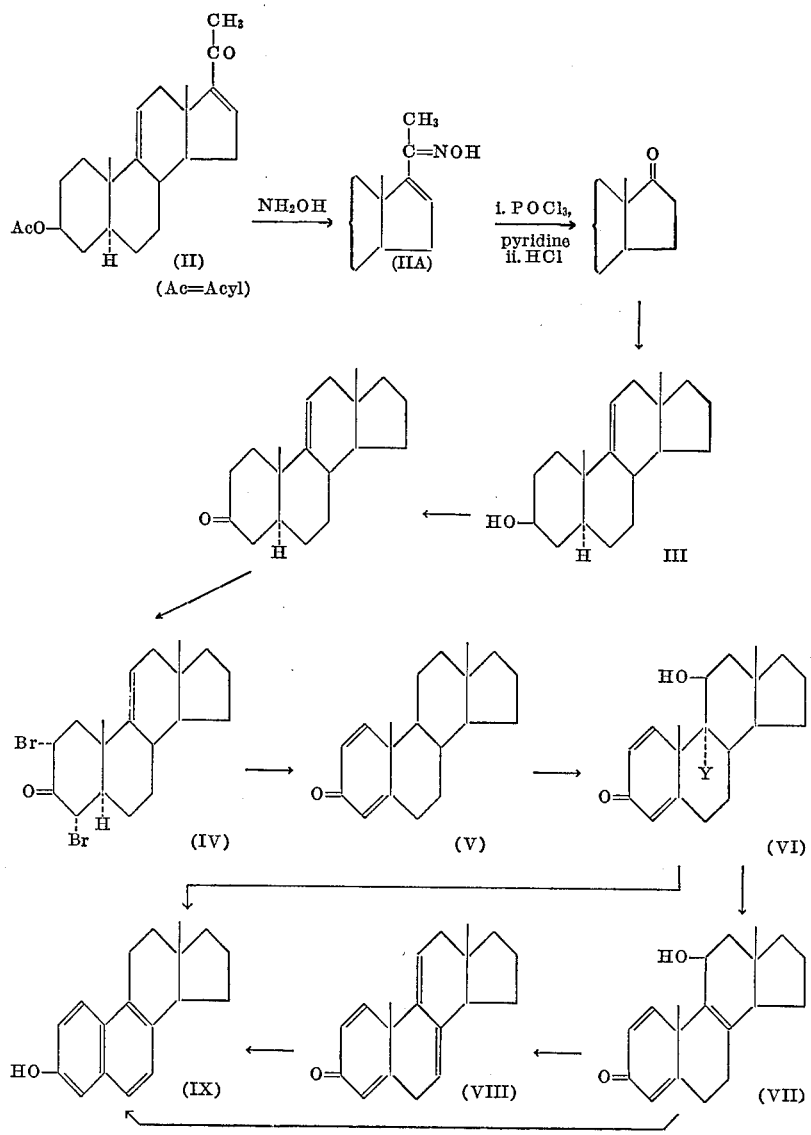

In addition the above reaction scheme shows a three-stage pathway from the 9α-halo-steroid (VI) (in which Y is chlorine or bromine) to the fully aromatised compound IX and while we do not wish to be bound by theoretical considerations, this appears to be an indication of the mechanisms whereby compound VI undergoes conversion to compound IX. Reaction of compound VI with a base such as collidine eliminates hydrogen halide to give a compound of Formula VII which on reaction with acid or with the Lewis base referred to above in the presence of chloride or bromide ions and an acid catalyst yields compound IX. Treatment of compound VII with acid under mild conditions however gives compound VIII which itself can also be converted into compound IX by treatment with acid or by the acid catalysed Lewis base reaction. The advantage of carrying out the acid catalysed Lewis base reaction in the presence of chloride or bromide ions is that it is capable of giving relatively high yields of the desired aromatic steroids and the presence of the chloride and bromide ions have been found to produce yields in considerable excess over those obtained using the Lewis base alone or using a weak nitrogen base of low dielectric constant, such as pyridine, alone. On the other hand, the conversion of compound VII or compound VIII to the desired compound IX can more simply be effected using acid alone as catalyst and this method has the advantage that if a primary or secondary alcohol is present, the resulting product comprises a 3-ether of compound IX, a type of derivative which is equally useful in the preparation of other oestrogenic steroids.

According to the present invention therefore we provide a process for the production of aromatic steroids of the skeletal formula

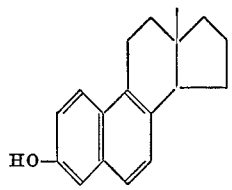

IX and their 3-ethers in which a compound of the skeletal formula

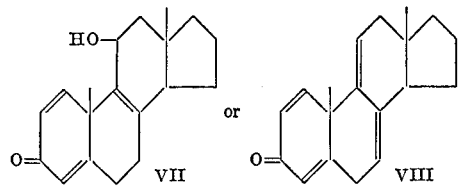

is reacted (a) with a strong acid in the presence or absence of an alkanol or (b) with a Lewis base having tertiary nitrogen atom and a dielectric constant above 15 together with a substance yielding chloride or bromide ions and an acid catalyst.

The conversion of the compounds of structure VII or VIII into compounds of structure IX is preferably effected at ambient temperature using a concentrated aqueous acid having strongly nucleophilic anions e.g. hydrochloric acid or hydrobromic acid, etc. An inert solvent may be present, for example, an ether, e.g. diethyl ether, dioxan, tetrahydrofuran or a tertiary alcohol e.g. t-butanol etc. If a primary alcohol is used as solvent, e.g. an alkanol having 1–6 carbon atoms such as methanol or ethanol, it is possible to use an acid having a less strongly nucleophilic anion, for example perchloric, sulphuric or phosphoric acid; under these conditions a 3-ether of the compound of Formula IX is produced. If a secondary alcohol is used as solvent, a mixture of 3-hydroxy compound and 3-ether is usually obtained.

In the conversion of compounds of structure VII or VIII to compounds of structure IX, a preferred acid medium is hydrobromic acid in the presence of dioxan or t-butanol.

The dielectric constant of the Lewis base is advantageously within the range of 30–40.

Bases which are preferred for the purpose of the invention are those containing one of the following groups:

(a) 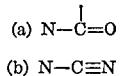

(b) 

Bases of high dielectric constant and suitable for the process of this invention may be chosen from the group of substituted amides of the general formula $R^1—CO.NR^2.R^3$ where $R^1$ is a hydrogen atom or an alkyl group containing 1 to 5 carbon atoms and $R^2$ and $R^3$, which may be the same or different, are each an alkyl group containing 1 to 5 carbon atoms, or, alternatively $R^1$ and $R^2$ or $R^2$ and $R^3$ may together form a divalent aliphatic group which, together with the adjacent nitrogen atom, forms a heterocyclic ring e.g. a piperidine, pyrrolidine or pyrrolidone ring. Examples of amides of this type are N,N-dimethylformamide, N,N - diethylformamide, N,N-dipropylformamide, N,N-dibutylformamide, N,N-dimethylacetamide, N,N-diethylacetamide, N,N-dimethylvaleramide, N,N-dimethylpropionamide, N - formylpiperidine, N-formylmorpholine and N-methylpyrrolidone.

Another convenient group of bases are substituted diamides of the general formula $R^2.R^3NCO.(CH_2)_nCO.NR^2.R^3$ where $R^2$ and $R^3$ have the significance defined above and $n$ is an integer from 1–5. Such compounds include for example N,N,N',N'-tetramethylsuccinamide and N,N,N',N'-tetramethyladipamide.

Another convenient group of tertiary bases are the N,N-dialkylcyanamides of formula $R^2R^3N.CN$ (where $R^2$ and $R^3$ have the meanings defined above), e.g. N,N-dimethylcyanamide.

Yet another group of bases are tetraalkylureas of the general formula $R^2.R^3N.CO.NR^2.R^3$ where $R^2$ and $R^3$ have the meanings defined above. Examples of such substituted ureas include N,N,N',N'-tetraethylurea.

In general, the preferred Lewis base is N,N-dimethylacetamide.

The source of chloride or bromide ions is preferably a chloride or bromide of an organic base, for example a hydrohalide addition salt of a tertiary organic base e.g. a trialkylamine, N-methylpiperidine, pyridine, collidine, etc. or a quaternary chloride or bromide of such a base, for example a methochloride, ethochloride etc.

Inorganic sources of the halide ions include alkali metal and alkaline earth metal chlorides and bromides.

The reaction is acid-catalysed and acid addition salts of weak organic bases such as pyridine may serve as acid catalysts as well as sources of chloride or bromide ions. Where acid is not generated in the reaction, i.e. when using compounds VII and VIII, the added acid may be an acid addition salt of a weak base or it may be a free acid such as hydrobromic, hydrochloric, sulphuric, phosphoric or p-toluene sulphonic acid. Where a salt of a strong base, e.g. a quaternary organic-base or an inorganic base, is used to supply chloride or bromide ions, further acid will be needed to catalyse the reaction of compounds VII or VIII.

The yield of the product of Formula IX can be enhanced by inclusion of a weak organic base, e.g. a tertiary organic base such as pyridine, collidine quinoline etc. A preferred combination to be added to the Lewis base is a mixture of pyridine and its hydrochloride or hydrobromide.

According to a modification of the process according to the invention, the compound of Formula IX may be prepared directly from a compound of Formula VI in which Y has the above meaning by reaction with a Lewis base having a tertiary nitrogen atom and a dielectric constant above 15 together with a compound yielding chloride or bromide ions.

The reaction using compound VI as starting material appears also to proceed by acid catalysis as in the conversion of VII or VIII to compound IX but the HX liberated during the reaction is able to function as catalyst and addition of acid is not essential although, as indicated below, it is usually advantageous.

The stearoids of Formulae VI, VII and VIII may carry varying substitution in the D ring for example a 17-oxo group, or a 17-hydroxy or 17-acyloxy group or a 17-aliphatic, 17-araliphatic, 17-acetyl or 17-acetoxyacetyl group in the presence or absence of a 17-hydroxy or 17-acyloxy group.

The 17-acyloxy group may, for example, be a lower aliphatic acyloxy group having 1–5 carbon atoms e.g. a propionyloxy or acetoxy group.

The conversion of a compound of structure VI to a compound of structure VII can, in fact, be effected merely by treatment with a base, preferably a tertiary organic base such as pyridine or collidine or alternatively a Lewis base as defined above in the presence of an inorganic base such as an alkaline earth metal carbonate or lithium carbonate.

The conversion of compounds of structure VII into compounds of structure VIII can be effected with acid under mild conditions, e.g. with a dilute solution of a mineral acid in an ether solvent for example by shaking in solution in a water-immiscible solvent such as diethyl ether with a dilute aqueous solution of an acid preferably a strong acid e.g. hydrochloric, or perchloric acid etc. Alternatively, a compound of structure VII can be treated wtih dioxan containing perchloric acid.

As indicated in the above reaction scheme, the 9α-halogen compound of structure VI can be prepared conveniently from a 9,11-dehydrosteroid of structure V by conversion to the 9β,11β-epoxide and reaction with a hydrohalic acid to give the desired halohydrin. The bromohydrin or chlorohydrin can however, be produced by direct addition of hypobromous or hypochlorous acid to the 9,11-double bond.

The compound of structure V can be prepared by dehydrobromination of a compound of structure IV using, for example, a Lewis base of the kind defined above, preferably in the presence of an alkaline earth metal carbonate or lithium carbonate and an alkali metal halide such as lithium bromide.

The dibromide of structure IV may be prepared from the corresponding compound of structure III by oxidation of the 3-hydroxy group e.g. with chromium trioxide in acetone, followed by dibromination e.g. using bromine in a solvent such as glacial acetic acid.

Where the compound of structure III is to have a 17-keto substituent, one can very conveniently start from a compound of structure II, which is an intermediate in the synthesis of betamethasone, by converting to the oxime IIA with hydroxylamine followed by reaction with phosphorus oxychloride in pyridine and subsequent treatment with hydrochloric acid, the 3-acetoxy group finally being hydrolysed e.g. using potassium bicarbonate in methanol.

Of the compounds described in the reaction scheme above compounds of structures IIA, VIII and 17-oxo compounds of Formula IV are new and constitute a further feature of the invention.

In order that the invention may be well understood we give the following preparation and examples by way of illustration only; all temperatures are in ° C.:

PREPARATION

Conversion of 3β-acetoxy-5α-pregna-9,16-dien-20-one into androsta-1,4,9-triene-3,17-dione (a) 3β-Acetoxy-5α-pregna-9,16-dien-20-one oxime.— A solution of 3β-acetoxy - 5α-prgena-9,16-dien - 20-one (10 g.) and hydroxylamine hydrochloride (3.5 g.) in ethanol (50 ml.) was boiled under reflux for 30 min. The mixture was cooled in ice and diluted with water (20 ml.) to precipitate the crude product. Crystallisation from ethyl acetate gave the oxime, M.P. 181–183°, $[\alpha]_D+105°$ (c., 0.97 in CHCl$_3$); $\lambda_{max.}$ (in EtOH) 235–237 mμ ($\epsilon$ 14,700). (Found: C, 74.2; H, 9.1; N, 3.95. C$_{23}$H$_{35}$NO$_3$ requires C, 74.4; H, 8.95; N, 3.8%).

(b) 3β-acetoxy - 5α-androst-9-en-17-one.—A solution of 3β-acetoxy - 5α-pregna - 9,16-dien-20-one oxime (446 g.) in pyridine (2230 ml.) was cooled to −20° and treated with a solution of phosphorus oxychloride (894 ml.) in pyridine (2680 ml.) at −40°, the reaction mixture being kept between −10° and −20° by means of an external cooling bath at −60°. The resultant suspension was stirred for 3 hr. at 0° and poured into a well-stirred brine-cooled mixture of ice (6.7 kg.) and concentrated hydrochloric acid (6.7 L.), the temperature being kept below +40° by adjusting the rate of addition. Fifteen minutes after the addition was complete the mixture was extracted with ether (20 L.) and the ether exrtact was washed with 2N-hydrochloric acid (12.5 L.). The ether was distilled from the dried (Na$_2$SO$_4$) extract in vacuo to leave crude 3β-acetoxy-5α-androst-9-en-17-one as a pale yellow solid which was used without purification in the next stage.

(c) 3β-hydroxy - 5α-androst-9-en-17-one.—The crude acetate, prepared as in (b), was dissolved in methanol (3750 ml.) and treated with potassium hydrogen carbonate (280 g.) and water (405 ml.). The mixture was boiled under reflux for 5 hr. with stirring, until thin-layer chromatography indicated that hydrolysis was complete. The hot mixture was diluted with water until crystallisation started and the suspension was then diluted gradually with water (to 20 L.) to complete precipitation of crude 3β-hydroxy - 5α-androst - 9-en-17-one (312 g.; 90%), M.P. 153–160°.

(d) 5α-androst - 9-en-3,17-dione.—The crude 3β-hydroxy - 5α-androst-9-en-17-one (308 g.), prepared as in (c), was stirred in solution in acetone (6160 ml.) with external water cooling, and M-sodium dichromate in 9 N-sulphuric acid (370 ml.) was added over 10 min. The resultant suspension was stirred for 30 min. and was then diluted gradually with water (18 L.). The crystalline 5α-androst - 9-ene - 3,17-dione (258 g.; 84.5%), M.P. 145–148°, $[\alpha]_D+152°$ (c., 0.7 in CHCl$_3$), was collected by filtration, washed with water and dried.

(e) 2α,4α-dibromo - 5α-androst - 9-ene-3,17-dione.— A solution of 5α-androst - 9-ene-3,17-dione (262.5 g.) in acetic acid (2.62 L.) was treated with 6.2 N-hydrogen bromide in acetic acid (38.9 ml.), The reaction mixture was kept at 20° by external ice-cooling during the addition of a solution of bromine (94.3 ml.) in acetic acid (4.6 L.) over ca. 5 min. After 2 hr. the crystalline 2α,4α-dibromo-compound (250 g.; 62%), $[\alpha]_D+76°$ (c. 1.1 in CHCl$_3$), which separated from the reaction mixture, was collected by filtration, washed with water, and dried at room temperature. A sample was recrystallised from benzene, to provide material with M.P. 182–182° (decomp.), $[\alpha]_D+78°$ (c., 0.92 in CHCl$_3$), (Found: C, 51.3; H, 5.55; Br, 34.8. C$_{19}$H$_{24}$Br$_2$O$_2$ requires C, 51.4; H, 5.45; Br, 36.0%).

(f) Androsta - 1,4,9-triene - 3,17-dione.—2α,4α-dibromo - 5α-androst - 9-ene - 3,17-dione (250 g.) was added at room temperature to a vigorously stirred suspension of calcium carbonate (500 g.; Calofort "U") in dimethylacetamide (3 L.) containing lithium bromide (125 g.). The suspension was heated at 130° for 4 hr., cooled, and poured into N-hydrochloric acid (30 L.).

The product was extracted into ether (2×10 L.) and the extract was washed with dilute hydrochloric acid. The dried (MgSO$_4$) extract was evaporated to dryness in vacuo to give a brown powder (123 g.; 78%), λ$_{max.}$ (in EtOH) 236–237 mμ

($E^{1\%}_{1cm.}$ 486)

which from its spectra and behaviour on thin-layer chromatography contained ca. 90% of androsta-1,4,9-triene-3,17-dione. Crystallisation of a sample (10 g.) from acetone, with charcoal treatment, gave purer material (4.0 g., M.P. 156–161°, [α]+$_D$105° (c., 0.97 in CHCl$_3$), λ$_{max.}$ (in EtOH) 236–238 mμ

($E^{1\%}_{1cm.}$ 524)

(g) 9α-bromo - 11β-hydroxyandrosta - 1,4-diene-3,17-dione.—Uncrystallised androsta-1,4,9-triene - 3,17-dione (100.7 g.) in tetrahydrofuran (960 ml.) and water (200 ml.) was treated with N-bromosuccinimide (80 g.) and then 60% perchloric acid (4 ml.). After 4 hr. at room temperature the reaction mixture was diluted with water (2 L.) and the oily product was extracted into methylene chloride. The extract was washed with aqueous sodium hydrogen carbonate and water, dried over magnesium sulphate, and concentrated to dryness in vacuo at <40°. The residual froth was treated with methyl acetate (500 ml.) to give a suspension of crystalline 9α-bromo - 11β-hydroxyandrosta - 1,4-diene-3,17-dione (74 g., 55%), which was collected by filtration and washed with cold methyl acetate. It showed M.P. 175–182° (Kofler), [α]$_D$+134.4° (c., 0.9 in dioxan), λ$_{max.}$ (in EtOH) 239–241 mμ

($E^{1\%}_{1cm.}$ 356)

(h) 11β-hydroxyandrosta-1,4,8(9)-triene-3,17-dione.— 9α-bromo - 11β-hydroxyandrosta - 1,4-diene - 3,17-dione (3 g.) and finely divided calcium carbonate (6 g.) in dimethylacetamide (20 ml.) was stirred and heated at 100° for 2 hr. The suspension was cooled, poured into water (300 ml.) and acidified with 2 N-hydrochloric acid (60 ml.). The crystalline 11β-hydroxyandrosta-1,4-8(9)-triene - 3,17-dione (2.116 g.; 89.5%), M.P. 227–231°, [α]$_D$+12° (c., 0.56 in CHCl$_3$) was collected by filtration, washed with water, and dried.

EXAMPLE 1

Preparation of equilenin from 9α-bromo-11β-hydroxy-androsta-1,4-diene-3,17-dione Pyridine (32 ml.) and pyridine hydrochloride (75 g.) were added to a stirred solution of 9α-bromo - 11β-hydroxy-androsta - 1,4-diene - 3,17-dione (74 g.) in dimethylacetamide (700 ml.) under nitrogen. The reaction mixture was heated at 105° for 6 hr., allowed to cool, and poured into water (2 L.). The suspension was extracted with ethyl acetate (1000 ml., 500 ml., and 500 ml.), and the extract was washed with dilute hydrochloric acid and then water. The extract was dried over magnesium sulphate and concentrated to small bulk. The equilenin (27.2 g., 52%) which separated was collected by filtration, washed with cold ethyl acetate and dried at 60°/0.1 mm. It had M.P. 255–256° (evacuated capillary), [α]$_D$+87° (c., 1.0 in dioxan), and ultraviolet and infrared spectra resembling those of an authentic sample.

EXAMPLE 2

Preparation of equilenin methyl ether from androsta-1,4,7,9-tetraene-3,17-dione with hydrobromic acid in methanol A suspension of androsta-1,4,7,9-tetraene-3,17-dione (1.0 g.) in methanol (10 ml.) was treated with 50% w./v. hydrogen bromide in acetic acid (1.0 ml.). The starting material dissolved in the stirred mixture and after 5 min. the product began to separate. After 18 hr., the crystalline equilenin methyl ether (883 mg.) was collected by filtration washed with methanol, and dried at 100°/0.1 mm. It showed λ$_{max.}$ (in EtOH) 230 mμ, $E^{1\%}_{1cm.}$ 2135 and its ultra-violet, infrared and proton magnetic resonance spectra resembled those of a standard sample.

EXAMPLE 3

Preparation of equilenin from 11β-hydroxyandrosta-1,4,8(9)-triene-3,17-dione with concentrated hydrochloric acid 11β-hydroxyandrosta-1,4,8(9)-triene-3,17-dione [prepared from 9α-bromo-11β-hydroxyandrosta-1,4-diene-3,17-dione as above or by the method of Tsuda, Nozoe and Okada (J. Org. Chem., 1963, 28, 789)], (200 mg.) was added to concentrated hydrochloric acid (2 ml.) under nitrogen. After 2 hr. at room temperature the mixture was diluted with water and extracted with ether. The dried ethereal extract was evaporated to dryness to leave a residue of equilenin (125 mg., 70%), M.P. 235–240° (evacuated capillary), [α]$_D$+88° (c., 0.8 in dioxan) with infrared, ultraviolet, and proton magnetic resonance spectra resembling those of an authentic sample.

EXAMPLE 4

Androsta-1,4,7,9-tetraene-3,17-dione

A suspension of 11β-hydroxyandrosta-1,4,8(9)-triene-3,17-dione (1.0 g.) in ether (500 ml.) was stirred with 2 N-hydrochloric acid (500 ml.) for 2 hr. at room temperature. All the starting material dissolved in ca. 30 min. The ethereal layer was separated, washed with water, dried over magnesium sulphate, and evaporated to dryness in vacuo to leave a residue of androsta-1,4,7,9-tetraene-3,17-dione (939 mg., 100%), λ$_{max.}$ (in EtOH) 233–235 mμ

($E^{1\%}_{1cm.}$ 943)

Its infrared spectrum resembled that of a sample recrystallised from acetone-petroleum ether, which had M.P. 171–176°, [α]$_D$+275° (c., 0.4 CHCl$_3$), λ$_{max.}$ (in EtOH) 234–236 mμ

($E^{1\%}_{1cm.}$ 966)

(Found: C, 81.2; H, 7.5. C$_{19}$H$_{20}$O$_2$ requires C, 81.4; H, 7.2%).

EXAMPLE 5

Preparation of equilenin from androsta-1,4,7,9-tetraene-3,17-dione with pyridine and pyridine hydrochloride in dimethylacetamide Androsta-1,4,7,9-tetraene-3,17-dione (160 mg.) in dimethylacetamide (2.0 ml.) and pyridine (90 mg.) was treated with pyridine hydrochloride (200 mg.) under nitrogen and heated at 100° for 5 hr. The cooled reaction mixture was poured into water (100 ml.) to precipitate equilenin (136 mg., 89.5%), M.P. 251–252° (evacuated capillary), which showed infrared, ultraviolet, and proton magnetic resonance spectra resembling those of an authentic sample.

EXAMPLE 6

Preparation of equilenin from androsta-1,4,7,9-tetraene-3,17-dione with concentrated hydrochloric acid Androsta-1,4,7,9-tetraene-3,17-dione (200 mg.) was added to concentrated hydrochloric acid (2 ml.). After 2 hr. the reaction mixture was diluted with water and the suspension was extracted with ether. The ethereal extract was washed with water, dried over magnesium sulphate, and evaporated to dryness. The residue was chromatographed on alumina (50 g., Brockman grade II). Elution with 10% ether in benzene yielded equilenin (130 mg. 69%), M.P. 240–245° (evacuated capillary), [α]$_D$+95° (c., 1.1 in dioxan), with ultraviolet, infrared, and proton magnetic resonance spectra resembling those of an authentic sample.

EXAMPLE 7

Preparation of equilenin from androsta-1,4,7,9-tetraene-3,17-dione with hydrobromic acid Androsta-1,4,7,9-tetraene-3,17-dione (200 mg.) was dissolved in aqueous 47% hydrobromic acid (s.g. 1.48; 2 ml.). The crystals which gradually separated were collected after 6 hr., washed with water, and recrystallised from ethyl acetate to give equilenin (66%), M.P. 240–246°, with infrared, proton magnetic resonance, and ultraviolet spectra resembling those of an authentic sample.

EXAMPLE 8

Preparation of equilenin from 11β-hydroxyandrosta-1,4,8,(9)-triene-3,17-dione with pyridine and pyridine hydrochloride in dimethylacetamide A solution of 11β-hydroxyandrosta-1,4,8(9)-triene-3,17-dione (297 mg.) in dimethylacetamide was treated with pyridine (0.16 ml.) and pyridine hydrochloride (350 mg.) and heated at 100° under nitrogen for 6 hr. Isolation as in Example 5 gave a crude product which, judged by thin-layer chromatography, was similar to that obtained in Example 5.

EXAMPLE 9

Preparation of equilenin from 11β-hydroxyandrosta-1,4,8(9)-triene-3,17-dione with hydrobromic acid in dioxan A suspension of 11β-hydroxyandrosta-1,4,8(9)-triene-3,17-dione (7.0 g.) in dioxan (120 ml.) was treated with 50% w./v. hydrogen bromide in acetic acid (5.0 ml.) and stirred for 90 min. at room temperature. The reaction mixture was poured into water (1.5 L.) and the precipitated crude equilenin (5.85 g., 93.7%), $[\alpha]_D + 98.5°$ (c., 0.56 in dioxan) was collected by filtration and dried. Part (5.4 g.) was recrystallised from ethyl acetate to give equilenin (3.08 g., 53.5%), $[\alpha]_D = 87.5°$ (c., 0.57 in dioxan), with infrared, proton magnetic resonance, and ultraviolet spectra resembling those of an authentic sample.

EXAMPLE 10

Preparation of equilenin methyl ether from 11β-hydroxyandrosta-1,4,8(9)-triene-3,17-dione with hydrobromic acid in methanol.

A suspension of 11β-hydroxyandrosta-1,4,8(9)-triene-3,17-dione (1.131 g.) in methanol (20 ml.) was treated with 50% w./v. hydrogen bromide in acetic acid (1.0 ml.) and stirred for 5 hr. at room temperature. The starting material dissolved and the product precipitated during the course of the reaction. The equilenin methyl ether (529 mg., 50%) was collected by filtration, washed with methanol, and dried at 100° in vacuo. It showed infrared, proton magnetic resonance, and ultraviolet spectra resembling those of an authentic sample.

EXAMPLE 11

Preparation of equilenin methyl ether from 11β-hydroxyandrosta - 1,4,8(9) - triene-3,17-dione with perchloric acid in methanol 11β - hydroxyandrosta - 1,4,8(9) - triene - 3,17 - dione (543 mg.) was stirred at room temperature for 22 hr. in methanol (10 ml.) containing 60% perchloric acid (0.05 ml.). The crystals (114 mg.) which formed were collected by filtration and washed with methanol. Their infrared, proton magnetic resonance, and ultraviolet spectra, and their behaviour on gas-liquid chromatography, indicated that they contained ca. 85% of equilenin methyl ether.

EXAMPLE 12

Preparation of equilenin ethyl ether from 11β-hydroxyandrosta-1,4,8(9)-triene-3,17-dione with hydrobromic acid in ethanol A suspension of 11β-hydroxyandrosta-1,4,8(9)-triene-3,17-dione (2.2 g.) in ethanol (40 ml.) was treated with 50% w./v. hydrogen bromide in acetic acid (2 ml.) and stirred at room temperature for 72 hr. The starting material dissolved and the product separated during the course of the reaction. The equilenin ethyl ether (1.34 g., 61.7%), $\lambda_{max.}$ 231 m$\mu$, $$E_{1\,cm.}^{1\%} 2074$$

was collected by filtration and washed with ethanol. It showed infrared and proton magnetic resonance spectra in accord with the assigned structure.

EXAMPLE 13

Preparation of equilenin ethyl ether from androsta-1,4,7,9-tetraene-3,17-dione with hydrobromic acid in ethanol A suspension of androsta-1,4,7,9-tetraene-3,17-dione (1.0 g.) in ethanol (10 ml.) was stirred and treated with 50% w.v. hydrogen bromide in acetic acid (1.0 ml.). The starting material dissolved and then the product began to separate. After 6 hr. the equilenin ethyl ether (788 mg.), M.P. 185–189°, was collected by filtration, washed with ethanol, and dried at 100°/0.1 mm. It showed $\lambda_{max.}$ (in EtOH) 231 m$\mu$, $$E_{1\,cm.}^{1\%} 2070$$

and infrared and proton magnetic resonance spectra in accord with the assigned structure. (Found: C, 81.4; H. 7.4. $C_{20}H_{22}O_2$ requires C, 81.6; H, 7.5%.)

EXAMPLE 14

Preparation of equilenin and its isopropyl ether from androsta-1,4,7,9-tetraene-3,17-dione with hydrobromic acid in isopropanol A suspension of androsta - 1,4,7,9 - tetraene-3,17-dione (500 mg.) in a mixture of isopropanol (9 ml.) and 50% w./v. hydrogen bromide in acetic acid (1.0 ml.) was stirred at room temperature. The starting material dissolved in 15 min. and after 30 min. the product began to separate. After 3 hr. the crystalline equilenin isopropyl ether (195 mg.) was collected by filtration, washed with isopropanol, and dried at 100°/0.1 mm. It showed $\lambda_{max.}$ (in EtOH) 232 m$\mu$, $$E_{1\,cm.}^{1\%} 2020$$

and a recrystallised sample showed ultraviolet, infrared, and proton magnetic resonance spectra in accord with the assigned structure. (Found: C, 81.9; H, 7.9. $C_{21}H_{24}O_2$ requires C, 81.7; H, 7.8%.)

Dilution of the filtered reaction mixture gave a mixture of equilenin and its isopropyl ether (295 mg.) $\lambda_{max.}$ (in EtOH) 231 m$\mu$, $$E_{1\,cm.}^{1\%} 2060$$

EXAMPLE 15

Preparation of equilenin from androsta-1,4,7,9-tetraene-3,17-dione with hydrobromic acid in t-butanol A suspension of androsta - 1,4,7,9 - tetraene-3,17-dione (500 mg.) in a mixture of t-butanol (9 ml.) and 50% w./v. hydrogen bromide in acetic acid (1.0 ml.) was stirred at room temperature. The starting material dissolved and the product then began to separate. After 3 hr. the precipitated equilenin (325 mg.) $\lambda_{max.}$ (in EtOH) 230 m$\mu$, $$E_{1\,cm.}^{1\%} 2260$$

was collected by filtration, washed with t-butanol, and dried at 100°/0.1 mm. Dilution of the filtrate with water gave more equilenin (140 mg.) $\lambda_{max.}$ (in EtOH) 230 m$\mu$, $$E_{1\,cm.}^{1\%} 2190$$

Both crops showed thin-layer chromatographic behaviour and infrared and proton magnetic resonance spectra resembling those of a standard sample.

EXAMPLE 16

Preparation of equilenin from 11β - hydroxyandrosta-1,4,8(9) - triene-3,17 - dione with hydrobromic acid in t-butanol A suspension of 11β-hydroxyandrosta-1,4,8(9)-triene-3,17-dione (500 mg.) in t-butanol (9 ml.) and 50% w./v. hydrogen bromide in acetic acid (1 ml.) was stirred at room temperature for 18 hr. The resultant suspension was diluted with water to 100 ml. and the precipitated equilenin (356 mg.), $\lambda_{max.}$ (in EtOH) 231 m$\mu$, $$E^{1\%}_{1cm.}\ 1970$$

was collected by filtration, washed with water, and dried at 100°/0.1 mm. Its infrared and proton magnetic resonance spectra and its behaviour on thin-layer chromatography indicated that it contained equilenin (90%), contaminated with androsta - 1,4,8(14),9(11) - tetraene-3,17-dione (10%).

EXAMPLE 17

Androsta-1,4,7,9-tetraene-3,17-dione

A suspension of 11β-hydroxyandrosta-1,4,8(9)-triene-3,17-dione (500 mg.) in dioxan (5 ml.) was treated with 60% perchloric acid (0.01 ml.) and stirred at room temperature. After 45 min. all the starting material had dissolved. After 5.75 hr. the solution was poured into water (100 ml.) and after 24 hr. the precipitate (375 mg.) was collected by filtration, washed with water, and dried at 80°/0.1 mm. Thin-layer chromatography and a proton magnetic resonance spectrum indicated that it was a mixture of androsta-1,4,7,9-tetraene-3,17-dione (80%) with androsta-1,4,8(14) - tetraene - 3,17 - dione (10%) and equilenin (10%).

EXAMPLE 18

Preparation of equilenin methyl ether from androsta-1,4,7,9-tetraene-3,17-dione with perchloric acid in methanol A suspension of androsta-1,4,7,9-tetraene-3,17-dione (200 mg.) in methanol (4 ml.) was treated with 60% perchloric acid (0.05 ml.). After 18 hrs. the crystalline product (150 mg.) was collected by filtration. If showed infrared and proton magnetic resonance spectra and behaviour on thin-layer chromatography indicating that it contained 80% of equilenin methyl ether and showed $\lambda_{max.}$ (in EtOH) 232 m$\mu$, $$E^{1\%}_{1cm.}\ 2002$$

EXAMPLE 19

Preparation of equilenin methyl ether from androsta-1,4,7,9-tetraene-3,17-dione with sulphuric acid in methanol A suspension of androsta-1,4,7,9-tetraene-3,17-dione (200 mg.) in methanol (4 ml.) was treated with concentrated sulphuric acid (0.05 ml.). After 18 hrs. the crystalline product (172 mg.) was collected by filtration. Its infrared and proton magnetic resonance spectra and behaviour on thin-layer chromatography indicated that it contained 80% of equilenin methyl ethe rand it showed $\lambda_{max.}$ (in EtOH) 232 m$\mu$, $$E^{1\%}_{1cm.}\ 2034$$

EXAMPLE 20

Preparation of equilenin methyl ether from androsta-1,4,7,9-tetraene-3,17-dione with phosphoric acid in methanol A suspension of androsta-1,4,7,9-tetraene-3,17-dione (200 mg.) in methanol (4 ml.) was treated with phosphoric acid (200 mg.). The starting material slowly dissolved and the product then began to separate. After 4 days, the crystals (110 mg.) were collected by filtration. They showed infrared and proton magnetic resonance spectra and behaviour on thin-layer chromatography indicating that they contained 85% of equilenin methyl ether and $\lambda_{max.}$ (in EtOH) 231 m$\mu$, $$E^{1\%}_{1cm.}\ 2143$$

EXAMPLE 21

Preparation of 3-methoxyoestra-1,3,5(10),6,8-pentaen-17β-ol (a) 11β,17β - dihydroxyandrosta - 1,4,8(9) - triene-3-one.—A solution of 11β - hydroxyandrosta - 1,4,8(9)-triene-3,17-dione (1.0 g.) in methanol (100 ml.) at 0° was treated with sodium borohydride (100 mg.) and after 25 mins. the excess of borohydride was destroyed with acetic acid (0.5 ml.). The solution was concentrated in vacuo to ca. to 20 ml. and diluted with water to 100 ml. to precipitate crystalline 11β,17β-dihydroxyandrosta-1,4, 8(9)-triene-3-one (815 mg.). Crystallisation from acetone —40° —60° petroleum ether gave material (464 mg.), $\lambda_{max.}$ (in EtOH) 240 m$\mu$, $$E^{1\%}_{1cm.}\ 522$$

(b) 3 - methoxyoestra - 1,3,5,(10),6,8-pentaen-17β-ol.—11β,17β-dihydroxyandrosta-1,4,8(9) - triene - 3 - one (100 mg.) in methanol (2 ml.) was treated with 50% w./v. hydrogen bromide in acetic acid (0.1 ml.). After 20 hrs. the solution was diluted with water (3 ml.). 3-methoxyoestra-1,3,5(10),6,8-pentaen-17β-ol (62 mg.) separated as plates, $\lambda_{max.}$ (in EtOH) 229 m$\mu$, $$E^{1\%}_{1cm.}\ 2035$$

with infrared and proton magnetic resonance spectra resembling those of an authentic sample.

EXAMPLE 22

17β-acetyl-3-methoxyoestra-1,3,5(10),6,8-petaen-17α-ol (a) 9α-bromo-11β,17α-dihydroxypregna - 1,4 - diene-3,20-dione.—A solution of 17α-hydroxypregna-1,4,9-triene-3,20-dione (19.4 g.) in tetrahydrofuran (380 ml.) and 0.46 N-aqueous perchloric acid (136 ml.) under nitrogen, was treated with N-bromoacetamide (12.28 g., 1.5 equivs.) at 0°. After 1 hr. at room temperature the reaction mixture was poured into an excess of sodium metabisulphite solution. Filtration gave the bromohydrin (24.3 g.) as a crystalline solid, M.P. 200–201° decomp.

(b) 11β,17α-dihydroxypregna-1,4,8(9) - triene - 3,20-dione.—9α-bromo-11β,17α-dihydroxypregna-1,4 - diene-3, 20-dione (9.0 g.) and finely divided calcium carbonate (18 g.) in dimethylacetamide (60 ml.) was stirred and heated at 100° for 6 hrs. The suspension was cooled, poured into water (900 ml.) and acidified with 2 N-hydrochloric acid (180 ml.). The crystalline 11β,17α-dihydroxypregna-1,4,8(9)-triene-3,20-dione (6.62 g.), $\lambda_{max.}$ (in EtOH) 237–240 m$\mu$, $$E^{1\%}_{1cm.}\ 482$$

was collected by filtration, washed with water, and dried.

(c) 17β-acetyl-3-methoxyoestra-1,3,5(10),6,8-pentaen-17α-ol.—11β,17α-dihydroxypregna-1,4,8(9)-triene - 3,20-dione (4.0 g.) in methanol (80 ml.) was treated with 50% w./v. hydrogen bromide in acetic acid (4 ml.) at room temperature for 18 hrs. The reaction mixture remained a suspension throughout. The crystalline 17β-acetyl-3-methoxyoestra-1,3,5(10),6,8 - pentaen - 17α - ol (2.75 g.) was collected by filtration. Its infrared and proton magnetic resonance spectra were consistent with the assigned structure and it showed $\lambda_{max.}$ (in EtOH) 229 m$\mu$, $$E^{1\%}_{1cm.}\ 2002$$

with subsidiary maxima at 266, 276, 287, 321 and 336 m$\mu$.

What is claimed is:

1. A process for the preparation of a steroid aromatic in rings A and B and having in the 3-position a member selected from the group consisting of hydroxy and alkoxy, comprising reacting a 3-keto-$\Delta^{1,4,7,9}$-10-methyl steroid with a member selected from the group consisting of (a) a strong acid and (b) a Lewis base having a tertiary nitrogen atom and a dielectric constant above 15 in the presence of an acid catalyst and ions selected from the group consisting of chloride and bromide ions, the reaction being with said member (a) in the presence of an alkanol when an alkoxy group is to be present at the 3-position, said strong acid being selected from the group consisting of hydrochloric acid and hydrobromic acids when a hydroxy group is to be present at the 3-position.

2. A process for the preparation of a 3-hydroxy steroid aromatic in rings A and B, comprising reacting a 3-keto-$\Delta^{1,4}$-10-methyl-11$\beta$-hydroxy steroid having at the 9-position a member selected from the group consisting of $\alpha$-chloro and $\alpha$-bromo with a Lewis base having a tertiary nitrogen atom and a dielectric constant above 15 in the presence of ions selected from the group consisting of chloride and bromide ions.

3. A process as claimed in claim 1 in which the reaction is with said member (a) in the presence of an alkanol selected from the group consisting of a primary alkanol and a secondary alkanol.

4. A process as claimed in claim 3 in which said alkanol is a member selected from the group consisting of methanol and ethanol.

5. A process as claimed in claim 1 in which the reaction is with said member (a) and said strong acid is hydrobromic acid, the reaction being carried out in the presence of a member selected from the group consisting of dioxan and t-butanol.

6. A process as claimed in claim 1 in which the reaction is with said mmber (b) and said Lewis base is a member selected from the group consisting of

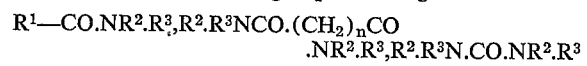

and R$^2$.R$^3$N.CN in which R$^1$ is singly a member selected from the group consisting of H and alkyl of from 1–5 carbon atoms; R$^2$ and R$^3$ are singly each alkyl of from 1–5 carbon atoms and together, with the nitrogen atom to which they are attached, a heterocyclic ring selected from the group consisting of a piperidine and pyrrolidine ring; R$^1$ and R$^2$ are together with the nitrogen atom to which R$^2$ is attached a pyrrolidone ring; and $n$ is an integer of from 1–5.

7. A process as claimed in claim 1 in which the reaction is with said member (b) and said acid catalyst is selected from the group consisting of a free acid and the acid addition salt of a weak base.

8. A process as claimed in claim 1 in which the starting 3-keto-$\Delta^{1,4,7,9}$-10-methyl steroid is prepared by reacting a 3-keto-$\Delta^{1,4,8}$-10-methyl-11$\beta$-hydroxy steroid with a dilute solution of a mineral acid in an ether solvent.

9. A process as claimed in claim 2 in which the starting 3-keto-$\Delta^{1,4}$-10-methyl-11$\beta$-hydroxy steroid having at the 9-position a member selected from the group consisting of $\alpha$-chloro and $\alpha$-bromo is prepared by reacting a 3-keto-$\Delta^{1,4,9}$-10-methyl steroid with a member selected from the group consisting of hypochlorous acid and hypobromous acid.

10. A process as claimed in claim 9 in which the starting 3-$\Delta^{1,4,9}$-10-methyl steroid is prepared by reacting a 3-keto-2$\alpha$,4$\alpha$-dibromo-$\Delta^9$-10-methyl steroid having at the 5-position an $\alpha$-hydrogen atom with a Lewis Base having a tertiary nitrogen atom and a dielectric constant above 15 in the presence of (a) a member selected from the group consisting of an alkaline earth metal carbonate and lithium carbonate and (b) an alkali metal halide.

11. A method as claimed in claim 10 in which the starting 3-keto-2$\alpha$,4$\alpha$-dibromo-$\Delta^9$-methyl steroid having at the 5-position an $\alpha$-hydrogen atom is prepared by oxidizing a 3-hydrogen-$\Delta^9$-10-methyl steroid having at the 5-position an $\alpha$-hydrogen atom and dibrominating the resulting 3-keto-10-methyl steroid.

12. A method as claimed in claim 11 in which the starting 3-hydroxy-$\Delta^9$-10-methyl steroid having at the 5-position an $\alpha$-hydrogen atom also possesses a 17-oxo group and is prepared by reacting a 3-acyloxy-$\Delta^{9,16}$-10-methyl steroid having at the 5-position an $\alpha$-hydrogen atom and at the 17-position a grouping

with phosphorous oxychloride in pyridine and subsequently hydrolysing the 3-acyloxy group.

13. A method as claimed in claim 12 in which the starting 3-acyloxy-$\Delta^{9,16}$-10-methyl steroid having at the 5-position an $\alpha$-hydrogen atom and at the 17-position a grouping

is prepared by reacting a 3-acyloxy-$\Delta^{9,16}$-10-methyl steroid having at the 5-position an $\alpha$-hydrogen atom and at the 17-position an acetyl group and hydroxylamine.

14. A process as claimed in claim 1 in which said 3-keto-$\Delta^{1,4,7,9}$-10-methyl steroid carries a member selected from the group consisting of 17-oxo; 17-hydroxy; 17-acyloxy; 17-aliphatic; 17-aliphatic, 17-hydroxy; 17-aliphatic, 17-acyloxy; 17-araliphatic; 17-araliphatic, 17-hydroxy; 17-araliphatic, 17-acyloxy; 17-acetyl; 17-acetyl, 17-hydroxy; 17-acetyl, 17-acyloxy; 17-acetoxyacetyl; 17-acetoxyacetyl, 17-hydroxy and 17-acetoxyacetyl, 17-acyloxy.

15. A compound of the formula

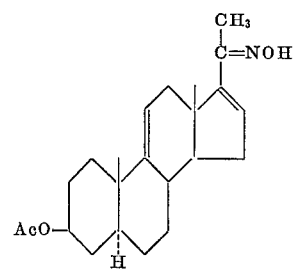

where Ac is an acyl group.

16. A process for the preparation of a 3-alkoxy steroid aromatic in rings A and B, comprising reacting a 3 - keto-$\Delta^{1,4}$-10-methyl-19$\alpha$-chloro or bromo-11$\beta$-hydroxy steroid with a Lewis base having a tertiary nitrogen atom and a dielectric constant above 15 in the presence of an inorganic base to produce a 3-keto-$\Delta^{1,4,8}$-10-methyl-11$\beta$-hydroxy steroid; reacting said 3-keto-$\Delta^{1,4,8}$-10-methyl-11$\beta$-hydroxy steroid with a strong acid in the presence of an alkanol; and isolating said 3-alkoxy steroid from the reaction mixture.

17. 2,4-dibromo-androsta-11-en-3,17-dione.

18. Androsta-1,4,7,9-tetraene-3,17-dione.

References Cited

UNITED STATES PATENTS 3,282,929   11/1966   Heller et al. _____ 260—397.3
3,293,217   12/1966   Heller et al. _____ 260—397.3

ELBERT L. ROBERTS, Primary Examiner

U.S. Cl. X.R.

260—397.4, 397.5, 397.45